Patented Oct. 12, 1954

2,691,680

UNITED STATES PATENT OFFICE 2,691,680

N - METHYL- 1 - (3 - HYDROXYPHENYL) -2- PHENYLETHYLAMINE AND ADDITION SALTS THEREOF

Louis H. Goodson, Kansas City, Mo., and Robert B. Moffett, Kalamazoo, Mich., assignors to George A. Breon and Company, Kansas City, Mo., a corporation of Missouri No Drawing. Application June 16, 1951, Serial No. 232,052

3 Claims. (Cl. 260—570.8)

This invention relates to N-methyl-1-(3-hydroxyphenyl)-2-phenylethylamine and to acid addition salts thereof.

The compounds of our invention are useful as pharmacological agents, and in particular are useful as mild analgetics.

N-methyl - 1 - (3-hydroxyphenyl) -2-phenylethylamine is a basic substance having the formula

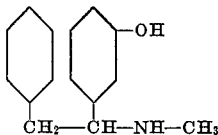

which reacts with organic and inorganic acids to form acid addition salts. Thus, for example, by interaction with the appropriate acid, the basic amine of our invention is converted into the hydrochloride, hydrobromide, sulfate, citrate, acetate, succinate, benzoate, phosphate, tartrate, etc. The free base and the acid addition salts are equivalent for many chemical and pharmacological purposes. When using aqueous solutions, it is generally preferable to employ a water-soluble addition salt, while in non-aqueous solutions the free amine is generally to be preferred.

N-methyl - 1 - (3-hydroxyphenyl) -2-phenylethylamine is conveniently prepared by interacting 3-hydroxybenzalmethylamine with benzylmagnesium chloride in anhydrous ether and decomposing the reaction mixture with ice and hydrochloric acid, thus producing the desired amine in the form of its hydrochloride. By treating the N-methyl-1-(3-hydroxyphenyl)-2-phenylethylamine hydrochloride with a suitable base such as ammonia or sodium hydroxide solution, there is obtained the free amine, namely N-methyl - 1 - (3-hydroxyphenyl) -2-phenylethylamine. If desired, the free amine is then reacted with an organic or inorganic acid to convert it to an appropriate salt.

Our invention is illustrated by the following example without, however, being limited thereto.

Example

To a suspension of 24 g. of 3-hydroxybenzaldehyde in benzene there was added a benzene solution of 9.3 g. of methylamine, and after standing for some time with occasional vigorous shaking, the reaction mixture was refluxed with a trap to separate the water which distilled from the solution. The solid in the reaction mixture did not dissolve completely, but the character of the crystals in the mixture changed as the reaction proceeded. After cooling the reaction mixture, the crystals were collected and dried and recrystallized from dioxane. There was thus obtained 20 g. of light brown crystals of 3-hydroxybenzalmethylamine, which melted at 150-153° C.

A solution of 19 g. of 3-hydroxybenzalmethylamine in 71 ml. of dry dioxane was added to a solution of benzylmagnesium chloride prepared by interaction of 13.6 g. of magnesium and 65 ml. of benzyl chloride in 200 ml. of dry ether. The mixture became very thick and 100 ml. of dry benzene was added to facilitate stirring. The reaction mixture was decomposed by treatment with ice and hydrochloric acid and the layers which appeared in the resulting mixture were separated. The aqueous layer was concentrated by heating under reduced pressure. From the concentrated material thus obtained, there separated in 30% yield N-methyl-1-(3-hydroxyphenyl) - 2 - phenylethylamine hydrochloride, which on recrystallization from methanol melted at 201–202° C. An aqueous solution of amine hydrochloride was treated with an excess of ammonium hydroxide solution, thereby liberating the free amine, N-methyl-1-(3-hydroxyphenyl) - 2-phenylethylamine, which when recrystallized from ethanol melted at 175.6–177.2° C. *Analysis.*—Calculated: 79.25% C; 7.54% H; 6.16% N. Found: 78.98% C; 7.54% H; 6.04% N.

This application is a continuation-in-part of our copending U. S. patent application Serial No. 692,378, filed August 22, 1946, now abandoned.

We claim:

1. A compound selected from the class consisting of N-methyl - 1 - (3 - hydroxyphenyl) -2-phenylethylamine, having the formula

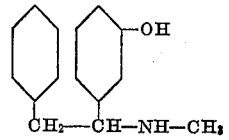

and acid addition salts thereof.

2. N-methyl-1-(3-hydroxyphenyl)-2-phenylethylamine, having the formula
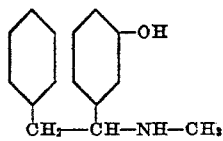
3. N-methyl-1-(3-hydroxyphenyl)-2-phenylethylamine hydrochloride.
References Cited in the file of this patent
UNITED STATES PATENTS
| Number | Name | Date |
|---|---|---|
| 2,504,122 | Goodson et al. | Apr. 18, 1950 |
| 2,506,588 | Goodson et al. | May 9, 1950 |
OTHER REFERENCES
Dodds et al.: "J. Physiol.," vol. 104 (1945), pp. 47–51.
Tainter et al.: "J. Pharm. Exp. Therap.," vol. 77 (1943), pp. 317–23.